(12) United States Patent
Jacobson et al.

(10) Patent No.: US 7,068,446 B2
(45) Date of Patent: Jun. 27, 2006

(54) COMPACT NON-IMAGING LIGHT COLLECTOR

(75) Inventors: Benjamin D. Jacobson, Chicago, IL (US); Robert D. Gengelbach, Rochester, NY (US)

(73) Assignee: Illumitech Inc., Chicago, IL (US)

( * ) Notice: Subject to any disclaimer, the term of this patent is extended or adjusted under 35 U.S.C. 154(b) by 22 days.

(21) Appl. No.: 10/838,948

(22) Filed: May 4, 2004

(65) Prior Publication Data
US 2004/0264004 A1    Dec. 30, 2004

Related U.S. Application Data

(60) Provisional application No. 60/467,881, filed on May 5, 2003.

(51) Int. Cl.
*G02B 17/00* (2006.01)
(52) U.S. Cl. ............... 359/726; 359/727; 359/729
(58) Field of Classification Search ........... 359/726, 359/727, 729, 730, 731, 732, 733, 720, 728, 359/737
See application file for complete search history.

(56) References Cited

U.S. PATENT DOCUMENTS

| | | | |
|---|---|---|---|
| 3,923,381 A | 12/1975 | Winston | ............ 359/852 |
| 4,045,246 A | 8/1977 | Mlavsky et al. | |
| 4,114,592 A | 9/1978 | Winston | |
| 4,240,692 A | 12/1980 | Winston | |
| 4,642,740 A | 2/1987 | True | |
| 4,964,713 A | 10/1990 | Goetzberger | |
| 5,001,609 A | 3/1991 | Gardner et al. | |
| 5,243,459 A | 9/1993 | Winston et al. | |
| 5,285,318 A | 2/1994 | Gleckman | |
| 5,610,768 A * | 3/1997 | Winston | ............ 359/727 |
| 5,699,201 A | 12/1997 | Lee | ............ 359/708 |
| 6,259,508 B1 * | 7/2001 | Shigematsu | ............ 355/53 |

OTHER PUBLICATIONS

Winston et al., "Investigations in Non-Imaging Optics: Detection of Faint Sources", SEES Symposium Session 5, Apr. 11, 1984, The University of Chicago, Chicago, Illinois.

Minano et al, "New Method of Design of Nonimaging Concentrators", Applied Optics, Jun. 1, 1992, pp. 3051-3060, vol. 31, No. 16, Optical Society of America.

Minano et al., "RX: A Nonimaging Concentrator", Applied Optics, May 1, 1995, pp. 2226-2235, vol. 34, No. 13, Optical Society of America.

Minano et al, "A High-Gain, Compact, Nonimaging Concentrator: RXI", Applied Optics, Dec. 1, 1995, pp. 7850-7856, vol. 34, No. 34, Optical Society of America.

(Continued)

*Primary Examiner*—Timothy Thompson
(74) *Attorney, Agent, or Firm*—Michael D. Rechtin; Foley & Lardner LLP

(57) ABSTRACT

A nonimaging optical system for processing a first and second light distribution. The nonimaging optical system includes at least two refractive surfaces, at least one reflective surface nearer to the first light distribution along at least one ray path than the nearer of the two refracting surfaces and the reflective surface and the refractive surfaces cooperating to redirect light edge rays of the first light distribution into the neighborhood of the edge of the second light distribution with a single reflection from the reflecting surface.

20 Claims, 4 Drawing Sheets

OTHER PUBLICATIONS

Figure 1:
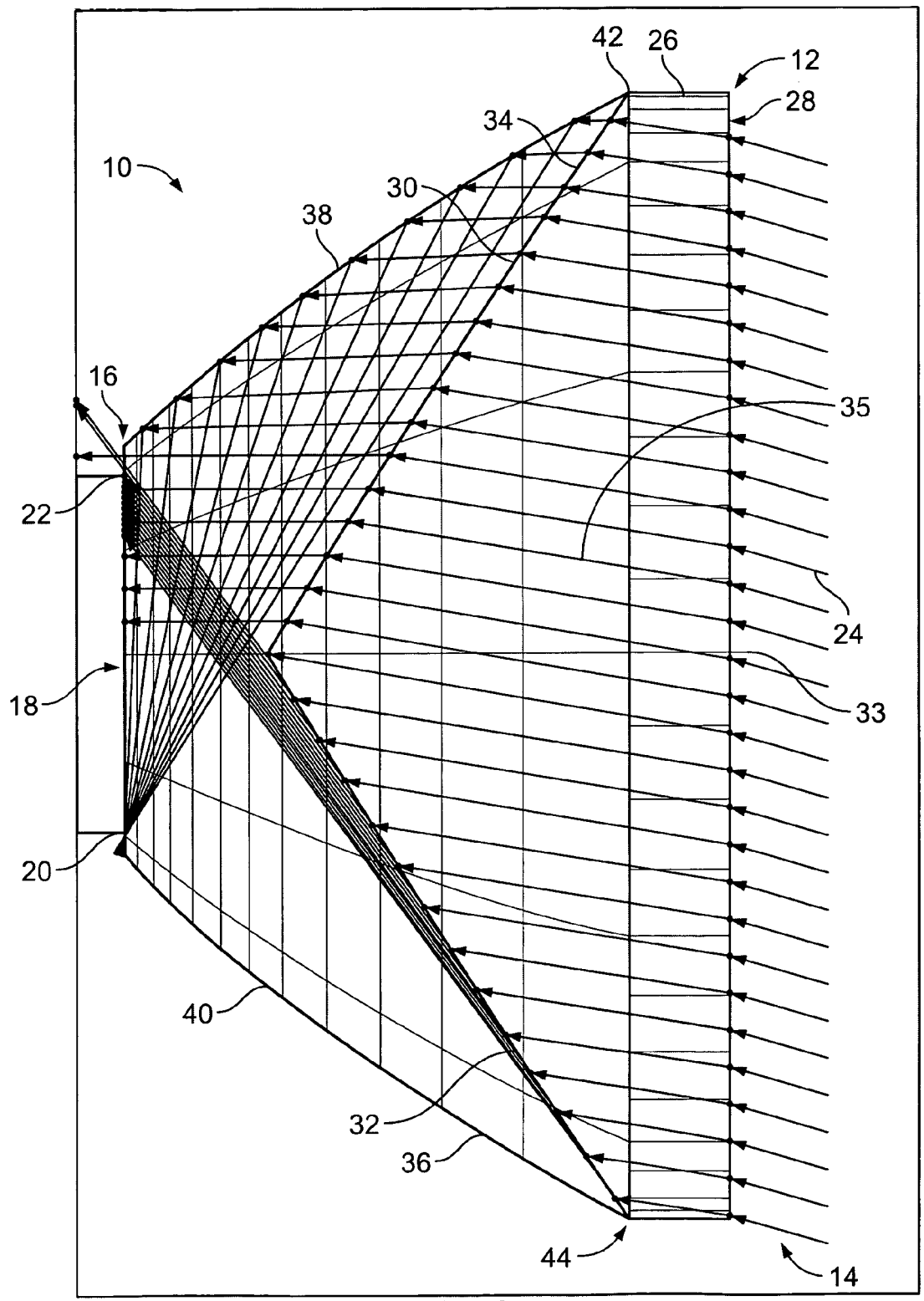

Minano et al., "Design of Nonimaging Lenses and Lens-Mirror Combinations", Nonimaging Optics: Maximum Efficiency Light Transfer, Proc. SPIE, 1991, pp. 104-115, vol. 1528.

Gordon, "Complementary Construction of Ideal Nonimaging Concentrators and its Applications", Applied Optics, Oct. 1, 1996, pp. 5677-5682, vol. 35, No. 28, Optical Society of America.

Winston et al., "Design of Nonimaging Concentrators as Second Stages in Tandem with Image-Forming First-Stage Concentrators", Applied Optics, Feb. 1, 1980, pp. 347-351, vol. 19, No. 3, Optical Society of America.

Feuermann et al., "Near-Maximum Solar Concentration with Imaging Designs", Solar Energy 65, 1999, pp. 83-89.

Friedman et al., "Optical Designs for Ultrahigh-Flux Infrared and Solar Energy Collection: Monolithic Dielectric Tailored Edge-Ray Concentrators", Applied Optics, Dec. 1, 1996, pp. 6684-6691, vol. 35, No. 34, Optical Society of America.

Bortz et al., "Optimal Design of a Nonimaging Projection Lens for Use with an LED Source and a Rectangular Target", Novel Optical Systems Design and Optimization III, Proc. SPIE, 2000, pp. 130-138, vol. 4092.

* cited by examiner

US 7,068,446 B2

COMPACT NON-IMAGING LIGHT COLLECTOR

BACKGROUND

High efficiency light collection is important in a number of applications, including lighting and illumination, displays, document scanning and machine vision, signalling, aviation and automotive lighting, medical instrumentation, infrared and optical wireless communications, and signal detection. Typically a light collection optical system is needed to convert a first spatial and angular distribution to a second, different spatial and angular distribution. Very commonly the collector couples light from a small, wide-angle source to a larger more collimated beam. It is generally desirable that such light collectors couple the highest possible fraction of light into the desired aperture and angles, with minimum size and cost.

Various light collectors are known in the art. Spherical lenses, aspheric lenses, and combinations of parabolic, elliptical, and hyperbolic mirrors have been used for centuries. Most of these systems are "imaging," meaning that the surfaces are designed to redirect light from a central point or angle in the first distribution to a central point or angle in the second distribution. Light from points or angles near enough to the center point or angle in the first distribution is, by similarity, redirected into the neighborhood of the center point or angle in the second distribution, with the same number of reflections or refractions for almost all the rays of interest. Unlike the central rays, the non-central points and angles are only approximately redirected into each other. Therefore control over the edges of the distributions is typically limited, and one of the light distributions often spreads over larger areas or angles than is desired, with non-uniform beam output and gradual rather than sharp angular cut-off. Control is particularly limited when one of the distributions has very large angles, or when the spatial extent of the smaller distribution is not much smaller than a characteristic length scale of the collector.

More recently introduced are "edge-ray" collectors which are designed to redirect the rays at the spatial or angular boundary of the first distribution to a spatial or angular boundary of the second distribution. It can be shown that, when distribution boundaries are so coupled, the rays in the interior of one distribution will then be coupled into the interior of the other distribution. However, different portions of the interior typically have a different number of reflections or refractions from each other or from the edge. In undergoing these different numbers of reflections or refractions, adjacent portions of the first distribution may end up non-adjacent in the second distribution, and therefore these collectors are "non-imaging." These non-imaging collectors provide much more precise control over the spread of the light distributions, typically maintaining both distributions within their theoretical limits even for large-area or large-angle beams that are poorly handled by imaging collectors. This more precise control is often desirable for the applications described above. Typically for these collectors opposite surfaces are designed to redirect opposite edges of the distribution.

Simple imaging collectors are typically very compact: for example, a parabolic mirror with ±90° light collection has a length-to-diameter ratio ("aspect ratio") of 0.25. By comparison, many non-imaging designs are undesirably U.S. Pat. No. 4,240,692 describes a non-imaging concentrator known as a Compound Parabolic Concentrator (CPC). The CPC is a hollow, funnel-shaped, mirror that redirects rays from a spatial edge at its small end into the angular edge of a beam at its large end. For narrow-angle beams, the CPC is undesirably long: for example, the aspect ratio of a ±10° CPC is over 3. The CPC can be truncated to reduce the length, but then efficiency is reduced or the spread of the light distribution is increased.

This aspect ratio has been reduced by a class of collectors using one refractive surface with a funnel-shaped reflective light-pipe. For example, U.S. Pat. No. 4,114,592 shows an alternate edge-ray collector known as a Dielectric Total Internal Reflection Concentrator (DTIRC) that uses a spherical refracting front surface. This improvement reduces the aspect ratio of a ±10° collector to approximately 1.7. U.S. Pat. No. 5,285,318 improves on the DTIRC by using an aspheric instead of a spherical refracting surface, reducing the ±10° aspect ratio to about 1.3. Friedman and Gordon published a further improvement in "Optical designs for ultrahigh-flux infrared and solar energy collection: monolithic dielectric tailored edge-ray concentrators," *Applied Optics*, Vol. 35, No. 34, 1 Dec. 1996, pp. 6684–91. They showed that with a different aspheric refracting surface the ±10° aspect ratio could be reduced to about 1.2, and that this was the theoretical limit with a single refraction at the front surface. Moreover, these designs require very thick dielectric components, which are difficult to mold accurately at low cost.

Minano and co-workers have published several designs that combine one refractive surface and one or more reflective surfaces. These designs reduce the aspect ratio to approximately 0.25; but in all these designs the small aperture is placed in front of a large back-reflecting mirror, so that the small aperture obstructs the large aperture. When the apertures are very different in size, as for narrow-angle collimators, the area ratio is low; and the obstruction can be small, but for larger angles the obstruction is unacceptable. Moreover, these collectors are often undesirable when a source or detector at the small aperture needs to be supported by a substrate including a circuit board or heat sink, as is common with high power LED light sources, for example. Minano and co-workers have also published designs with two refracting surfaces and no reflecting surfaces, but the largest collection angle at the small aperture is limited.

The current invention uses an aspheric dielectric lens with two refracting surfaces at the large aperture of a hollow, funnel-shaped reflector. The back surface of the dielectric (the surface facing the reflector) has higher curvature than the front surface, making the structure more compact. This approach achieves performance comparable to a non-truncated CPC, with much better compactness. Aspect ratios range from 0.4–0.75. Moreover, the dielectric lens has acceptably low thickness for cost-effective molding. Unlike the Minano designs, the small aperture of the funnel is advantageously positioned behind the optic, so that a source or detector can be supported by a much larger circuit board or heat sink without shadowing. Winston and co-workers have published designs with a spherical lens and funnel-shaped reflector, including U.S. Pat. No. 5,243,459, but these designs are not nearly as compact as the current invention.

DETAILED DESCRIPTION OF PREFERRED EMBODIMENTS

One embodiment of an optical system shown generally at 10 in FIG. 1 with operation is the collector mode. The figure shows a cross-section with a large aperture 12 on the right coinciding with a front-surface distribution 14 having an angular range ±θ, where the rays at +θ and −θ are angular edge-rays. FIG. 1 also shows a small aperture on the left 16 coinciding with a back-surface distribution 18 having a bottom edge 20 and a top edge 22. The spatial extent of the back-surface distribution 18 can be smaller than or equal to the extent of the small aperture 16. In one embodiment, the optical system 10 is a surface of revolution of the cross-section shown, so that the input and output apertures 16 and 12 are circular. In a second embodiment, it can be a trough-shaped element continuing this cross-section perpendicular to the plane of the page. In a third embodiment, the optical system 10 has four or six similar sides connecting to form square or hexagonal input and output apertures.

The optical system 10 cross-section shown is designed to transform a large ±15° beam 14 into a smaller ±90° beam 18. The rays 24 shown are edge rays, entering the lens 26 at −15°, the boundary of the desired front surface distribution 14. The front surface 28 of the lens 26 is flat. The back surface 30 of the lens 26 is sloped and curved. In FIG. 1, the cross-section shows the back surface 30 having a bottom arm 32 and a top arm 34 on opposite sides of the centerline 33. The back side bottom arm 32 is shaped and angled to redirect the edge rays 24 striking that one side approximately to the top edge 22 of the back-surface distribution. It will be appreciated that opposite edge-rays at +15° (not shown) striking the back surface top arm 34, by symmetry, would be redirected approximately to the bottom edge 20 of the back-surface distribution. Therefore, necessarily, the −15° edge-rays 24 striking the back surface top arm 34 cannot also be redirected to the back-surface distribution edge 20 by refraction alone. The reflector surface 36 fills this function. The reflector top arm 38, as shown, is shaped to redirect the −15° edge-rays 24 that strike it to the bottom edge 20 of the back-surface distribution. By symmetry, the +15° edge-rays (not shown) that strike the bottom arm of the reflector 40 would be redirected to the top edge 22 of the back-surface distribution. Thus the lens 26 and reflector 36 act cooperatively to redirect substantially all the angular edge-rays 24 into the neighborhood of the edges 20 and 22 of the back-surface distribution 18. The collector 10 is etendue-preserving: i.e., the first and second beam distributions 14 and 18 approximately satisfy the equation $$n_1 D_1 \sin \theta_1 = n_2 D_2 \sin \theta_2 \qquad (1)$$

In FIG. 1, for example, $\theta_1$ is the front surface angle=θ=15° and $\theta_2$ is the maximum back-surface angle=90°.

The refractive surfaces can have a variety of shapes. In FIG. 1, the lens front surface 28 is flat and the back surface 30 is a single hyperbola. In another embodiment, the back surface is a compound hyperbola: the bottom and top arms 32 and 34 are opposing, oppositely tilted off-axis hyperbolas. When the front surface 28 is flat, as in FIG. 1, the off-axis hyperbola 32 has an axis parallel to the segments 35 of the edge-rays 24 interior to the lens 26, so that the bottom arm 32 redirects the ray segments 35 to focus substantially near the edge 22 of the back surface distribution.

The hyperbola 32 has eccentricity=n=the index of the lens material (1.49 for PMMA plastic in FIG. 1). The focus of the hyperbola is the edge 22 of the back-surface distribution.

The parameter l is chosen such that the curve intersects the desired outer edge position 42 of the lens aperture 44, giving the lens 26 the desired aperture diameter and placing it at the desired distance from the back-surface distribution 18. In FIG. 1, the back surface 30 is a single conic with parameters chosen to best-fit the off-axis hyperbolas. As will be apparent to one skilled in the art, the surface shapes 28 and 30 can be varied slightly as long as the overall slope changes are sufficiently small that the surface 32 continues to redirect the angular edge-rays 24 approximately to the edge 22 of the back-surface distribution as shown.

The reflector 36 in FIG. 1 can likewise have a variety of shapes, so long as it redirects the angular edge-rays 24 approximately to the bottom edge 20 of the back-surface distribution as shown. The shape may be calculated once the lens shape is determined. This shape could be designed to focus the edge-rays exactly, by solving numerically for the slope and position at each point (i.e., by solving the appropriate differential equation), or by solving an equal-optical-path-length equation. Alternatively, the reflector 36 can focus the edge-rays 24 only approximately at the bottom edge 20 of the back-surface distribution, either by solving a slightly different differential equation or path length equation, or by iteratively optimizing a polynomial or conic section. The reflector 36 in FIG. 1 is an off-axis conic section.

Figure 2:
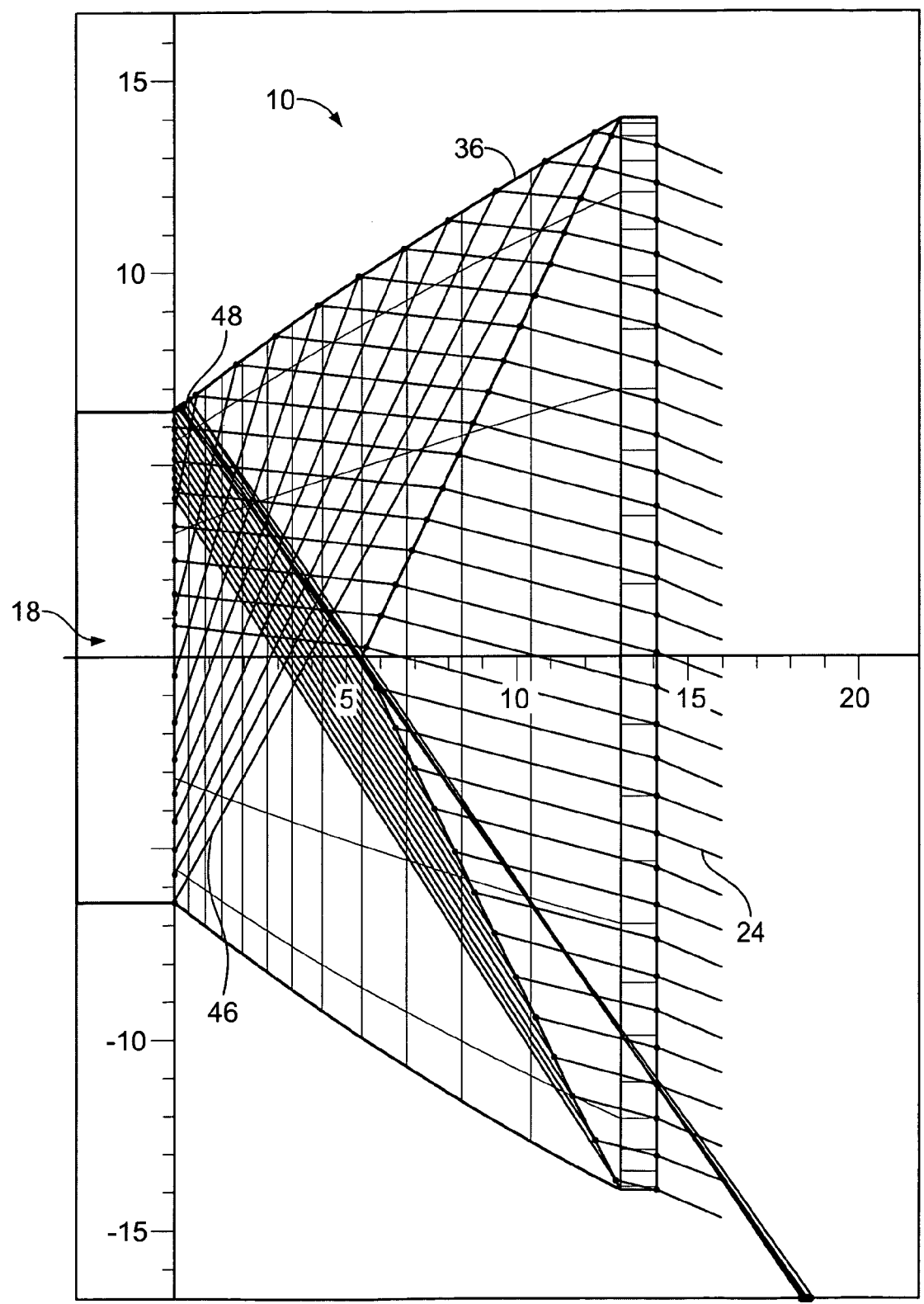

FIG. 2 shows another embodiment of the optical system 10, in which the front-surface angular edge-rays 24 at $-\theta_1$ are redirected to the extreme angles of the back-surface distribution 18 $+\theta_2$ (shown at 46) and $-\theta_2$ (shown at 48), rather than to a spatial edge of the back-surface distribution 18 as in FIG. 1. In this case $\theta_1$ and $\theta_2$, along with the associated spatial diameters, approximately satisfy equation (1). The reflector 36 can also be a compound reflector, in which a front portion of the reflector 36 focuses the edge-rays 24 to the bottom 20 of the back-surface distribution as in FIG. 1, and a back portion focuses the edge-rays 24 to a maximum angle 46 as in FIG. 2.

Figure 3:
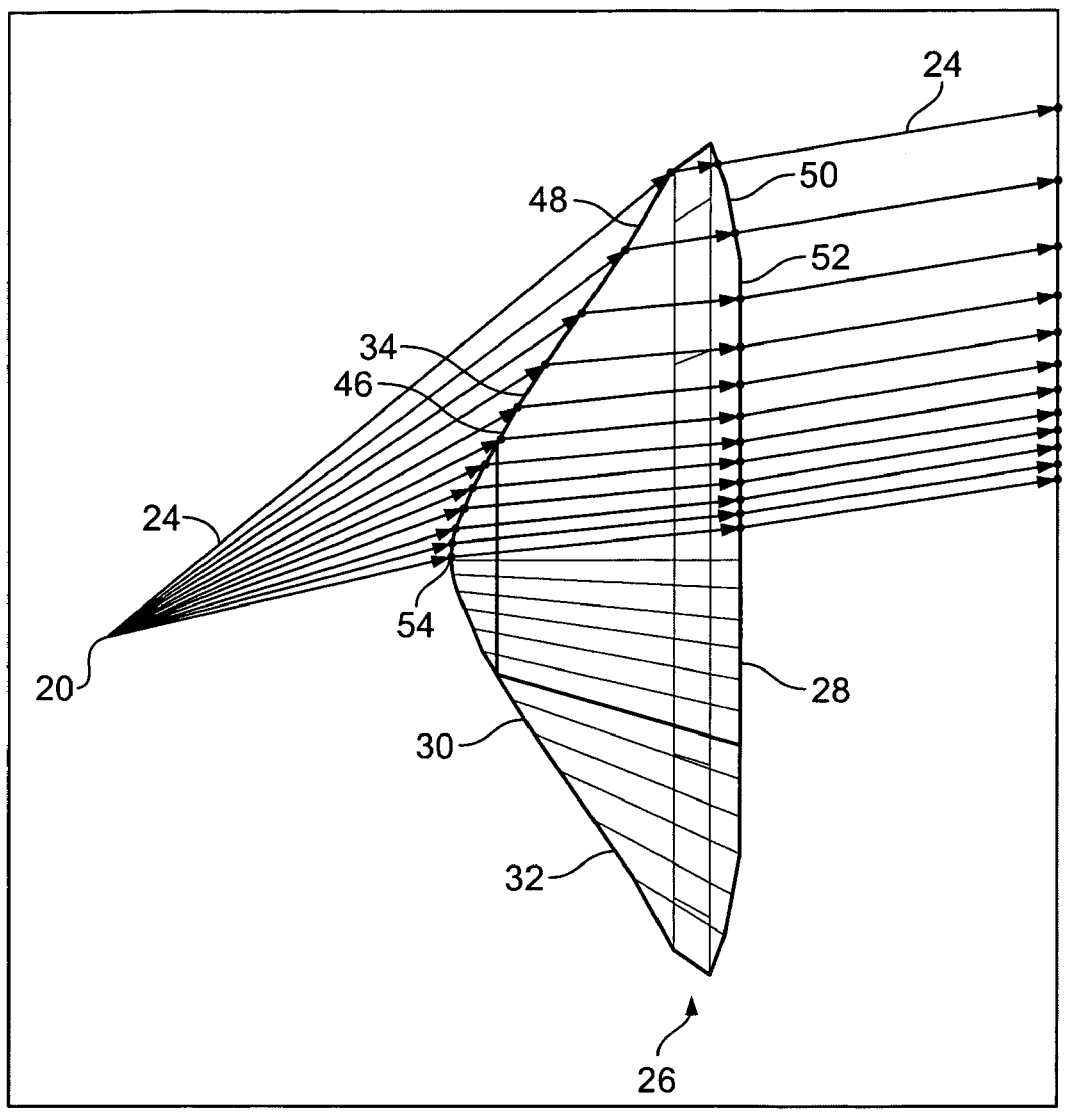

FIG. 3 shows another embodiment (for simplicity the reflector is not shown). In this embodiment each back surface arm 32 and 34 is a combination of off-axis hyperbola and logarithmic spiral. The inner portion 46 of each arm (closest to the centerline) is a hyperbola as described above. The outer portion 48 is a logarithmic spiral, with the equation in the same coordinate system described above:

$$r(\phi) = r_0 e^{(\phi - \phi_0) \tan \theta_{imax}} \qquad (2)$$

Since the logarithmic spiral is the outer section, the parameters $r_0$ and $\phi_0$ are chosen to provide the desired diameter and position. The parameter $\theta_{imax}$ is the angle of incidence made by the edge-rays 24 with the lens surface 48 in the medium (usually air) between the lens 26 and the reflector. The designer may limit this angle to minimize Fresnel reflections. The inner section 46 of each arm is an off-axis hyperbola as described above, but now the parameter l is chosen to provide a continuous surface with the outer logarithmic spiral section 48.

In the embodiment of FIG. 3 the front surface 28 of the lens 26 is likewise two sections. The outer portion 50 is designed to cooperate with the log spiral portion 48 of the back surface to refract the angular edge-rays 24 to the edge 20 of the back-surface distribution as described previously. This portion 50 could be designed by solving numerically for the slope and position at each point, by solving an equal-optical-path-length equation, or by iteratively optimizing a polynomial or conic section. The inner portion 52 of the front surface is flat. The edge rays 24 striking this flat inner portion 52 are redirected to the inner, off-axis hyperbola portion 46 of the back surface.

In FIG. 3, $\theta_{imax}=70°$ and is held constant; but $\theta_{imax}$ could also be varied across the surface without changing the essential focusing of the angular edge-rays 24 onto the back-surface distribution edge 20. The compound back surface 34 can also include a flat central section, to simplify the optics by avoiding having a cusp at the center 54, and increase manufacturability.

The refractive component 26 can be made of a variety of materials. In FIG. 1 the lens material has index 1.49, as for PMMA (also known as acrylic) that is commonly used for molded optical parts. Other materials such as glass and polycarbonate can also be used, as long as the material is substantially transparent to the wavelengths of interest. Higher-index materials increase the overall compactness, and can also affect the cost, reliability, manufacturability, or mechanical properties of the device. The lens 26 shown in FIG. 3 uses polycarbonate with index approximately 1.59. The small-aperture-to-lens distance is accordingly smaller than would be obtained with PMMA. The material can be formed to the desired shape by one or more processes of molding, machining, or casting.

The reflector 36 can be any solid material including plastic, glass, ceramic, or metal, provided that inner surface is given an approximately specular finish and has a high reflectivity for the wavelengths of interest. The material can be formed to the desired shape by one or more processes of molding, machining, or casting. For materials that lack intrinsically high reflectivity, the surface 36 can be coated with high-reflectivity materials, for example aluminum. The inner surface can also have a transparent protective coating to increase the robustness and lifetime of the reflectivity.

Compactness is a critical advantage of the current optical system 10, and there are a number of design modifications that can be introduced to reduce the size. The focus of the edge-rays 24 onto the back-surface distribution edge 20 or 22 can be approximate, as shown in FIG. 1, rather than exact as in FIG. 3. Likewise, the angles of the angular edge-rays 24 at the large aperture could be varied to reduce the required curvature, particularly at the outer portion where the largest refraction is required.

Figure 5:
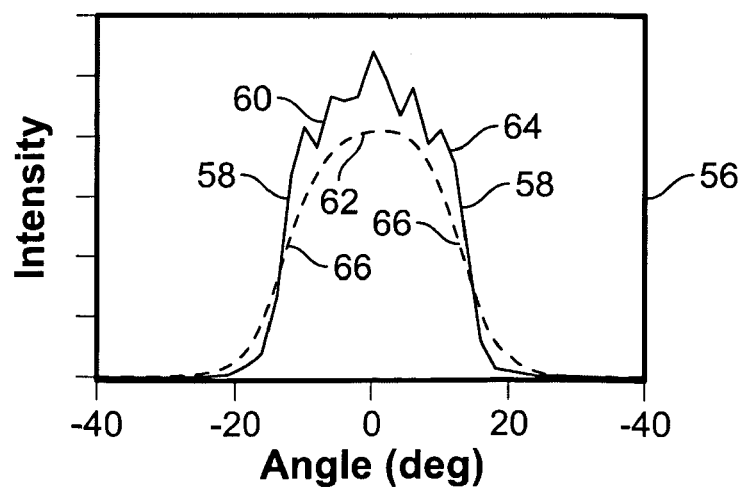
Figure 4:
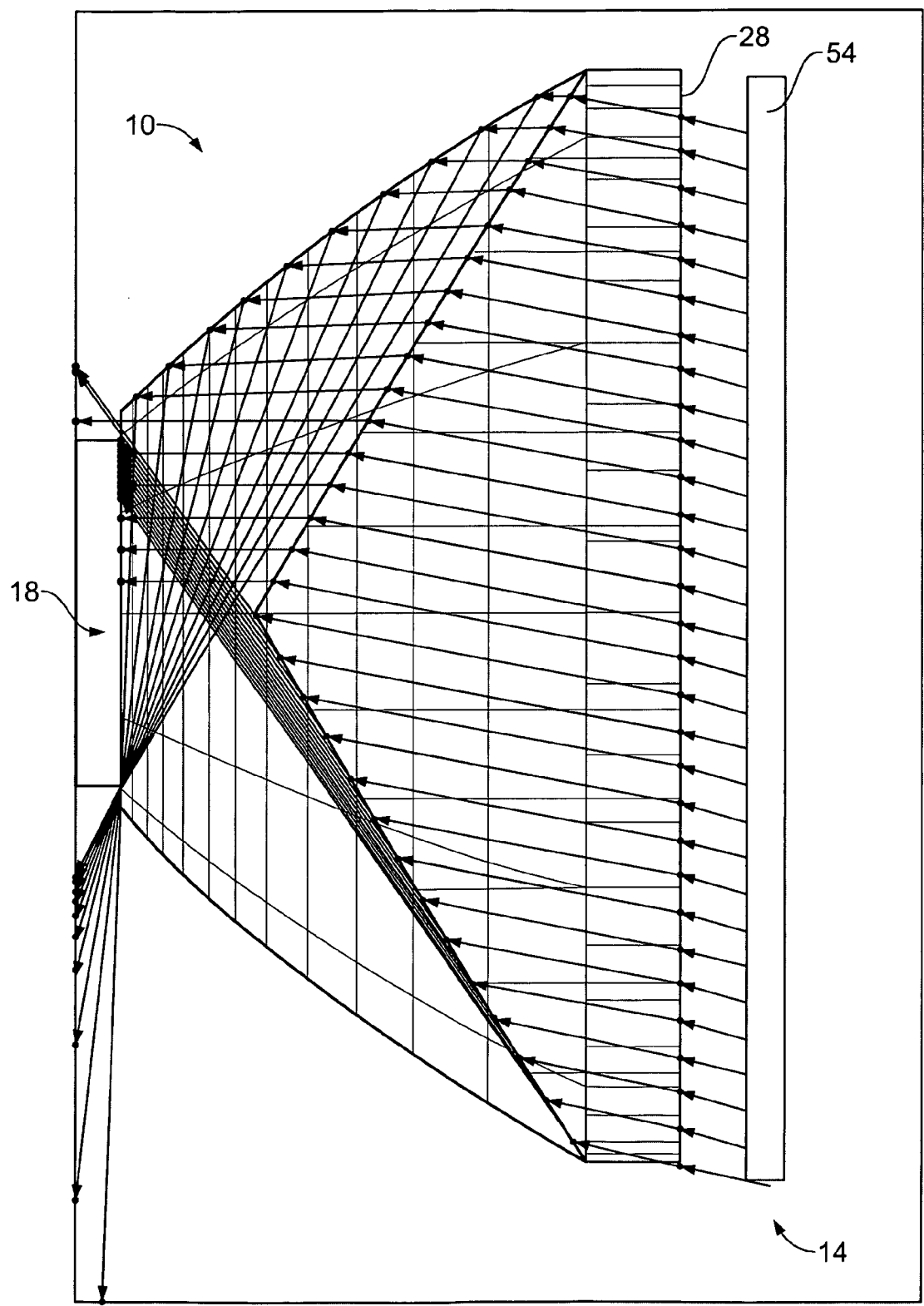

FIG. 4 shows a further embodiment of the optical system 10, in which the front refractive surface is overlaid with a diffuser layer 54. The diffuser layer 54 redirects a ray from a single angle $\theta$ into a spread of angles $\theta \pm \Delta\theta$. The diffuser improves the uniformity of the light output distribution. FIG. 5 shows an example 56 of a light output distribution measured with (62) and without (64) a diffuser 54. In the device used to make this measurement, the back-surface distribution 18 is the light output of an LED array placed at the small aperture. The measurement shows the front-surface output 14 vs. far-field angle. Without the diffuser 54, the output light has exceptionally sharp cut-offs 58, but also has noticeable non-uniformities 60. In the measurement of FIG. 5 the non-uniformities 60 are especially pronounced because the LED array source is non-uniform. The diffuser 54 removes the non-uniformities 60 and also softens the angular cut-off 66. In most cases a more uniform beam is advantageous. In general it is desirable to maximize uniformity while maintaining sharp as possible angular cut-off, but in some cases a softer cut-off is advantageous as well. Different diffusers will provide different uniformity vs. cut-off trade-offs. In general a diffuser with larger $\Delta\theta$ will improve the uniformity more, but will also soften the cut-offs more.

The exact nature of the diffuser will determine the trade-off, and also other characteristics of the output as well. Other desirable features of a diffuser are high transmission efficiency, and a low degree of scattering into large angles beyond the desired $\Delta\theta$. FIG. 5 was measured with a high-quality holographic diffuser. Such diffusers provide high (90% or greater) transmission efficiency, low scattering, and provide an excellent maximum uniformity enhancement for a given angular cut-off. Other types of diffusers known in the art include random rough-surface diffusers, microlens diffusers, and lenticular diffusers. All of these diffusers can be cost-effectively manufactured by embossing or casting a polymer film or sheet with an appropriate surface pattern. For example, holographic diffusers can be made by creating a holographic surface pattern in a metal tool and using the tool to emboss or cast a polymer film.

In a further embodiment the diffuser 54 can be an "elliptical diffuser" that redirects light into an asymmetrical distribution. For example, a ray at $\theta$ can be redirected into $\pm\Delta\theta_H$ in the horizontal direction and $\pm\Delta\theta_V$ in the vertical direction. The resulting light output distribution can then be larger in one axis than in the other. For example, a wider horizontal distribution is often desirable for lighting a display arranged on a horizontal surface.

An advantage of using a separate polymer film 54, as in FIG. 4, is that multiple beam patterns can be obtained without changing the shape of the optic. For example, multiple patterns can be obtained from a single set of optic molds, enabling the supplier to offer multiple options without incurring the tooling cost associated with multiple mold sets. Another advantage is that the user can buy a single light source with optic and multiple diffusers, and then change the beam pattern in place by substituting different diffusers.

However, adding a separate diffuser layer 54 to the assembly also increase per-unit cost and potentially reduces reliability. In a further embodiment, uniformity enhancing features can be added to the reflective or refractive surfaces 36, 28, and 20 of the optical system 10. These features can include facets, roughness, or a holographic diffuser pattern. In a preferred embodiment, a holographic diffuser pattern is added to the mold surface that forms the front refractive surface 28.

A highly preferred feature of the invention is the presence of an aspheric back refractive surface together with a front refractive surface and at least one funnel-shaped reflective surface, all three surfaces acting cooperatively to redirect edge-rays from a first distribution into edge-rays of a second distribution. An advantageous feature is that the two distributions approximately satisfy the etendue-preservation equation in equation (1). An additional advantageous feature is the higher curvature of the back refractive surface, causing the lens to protrude substantially back into the funnel-shaped reflector to maximize the compactness of the device. Another advantageous feature is the addition of at least one uniformity-enhancing feature, such as a holographic diffuser surface.

While preferred embodiments of the invention have been shown and described, it will be clear to those skilled in the art that various changes and modifications can be made without departing from the invention in its broader aspects.

What is claimed is:

1. A non-imaging optical system for processing a first and second light distribution and at least one ray path connecting said light distributions, the optical system comprising:
    at least two refractive surfaces;
    at least one reflective surface nearer to said first distribution along at least one ray path than the nearest of said two refracting surfaces; and
    said reflective surface and said refractive surfaces cooperating to redirect light edge-rays of said first light distribution substantially into the neighborhood of the edge of said second light distribution with no more than a single reflection from said at least one reflecting surface and no more than a single refraction between said first light distribution and said at least one reflecting surface.

2. The device of claim 1, where said reflective surface includes a first aperture nearer to said first light distribution and a second aperture nearer to said second light distribution, said second aperture being larger than said first aperture.

3. The device of claim 2, where said reflective surface comprises a hollow metallized surface.

4. The device of claim 1, where the combination of said reflective and refractive surfaces has an aspect ratio less than 1.5.

5. The device of claim 1, where at least one of said refracting surfaces comprises an aspheric surface.

6. The device of claim 5, where said aspheric refracting surface has a higher curvature than at least one of the remainder of said refracting surfaces.

7. The device of claim 6, where said higher curvature refracting surface is nearer to said reflecting surface than at least one of said remainder of said refracting surfaces.

8. The device of claim 1, where said first distribution includes a virtual image of a third light distribution, said virtual image formed by a third refractive surface nearer to said first light distribution than said reflecting surface.

9. The device of claim 8, where said third refractive surface includes at least one substantially hemispherical portion.

10. A non-imaging optical system for processing a first and second light distribution and at least one ray path connecting said light distributions, the optical system comprising:
at least two refractive surfaces;
at least one reflective surface nearer to said first light distribution along said at least one ray path than the nearest of said two refracting surfaces; and
the combination of said refractive surfaces and said reflective surface having an aspect ratio less than 2.5.

11. The device of claim 10, including at least one diffusing surface.

12. The device of claim 11, where said diffusing surface comprises a film positioned near an output aperture.

13. The device of claim 12, where said diffusing surface comprises at least one of a microstructured surface, a roughened surface, and a holographic diffuser surface.

14. The device of claim 11, where said diffusing surface comprises at least one of said two refracting surfaces and said reflective surface.

15. A non-imaging optical system for processing a first and second light distribution and a plurality of ray paths connecting a plurality of neighborhoods of the edges of said light distributions, the optical system comprising:
at least two refractive surfaces;
at least one reflective surface nearer to said first light distribution along at least one of said ray paths than the nearest of said two refracting surfaces, and on the same side of said first light distribution as said two refractive surfaces;
at least one of said refractive surfaces redirecting a first portion of said ray paths substantially into the neighborhood of the edge of said first light distribution without intersecting said at least one reflective surface.

16. The device of claim 15, where at least one of said refractive surfaces comprises an aspheric surface.

17. The device of claim 15 where at least one of said refractive surfaces is constructed in accordance with an equal-optical-path-length algorithm for said first portion of said ray paths.

18. A non-imaging optical system for processing a first and second light distribution, said first and second light distributions having angular distributions whose central rays are substantially parallel and pointing in the same direction, the optical system comprising:
at least one refractive surface;
at least one substantially continuously connected reflective surface on the same side of said first light distribution as said at least one refractive surface;
the combination of said at least one refractive surface and said reflective surface having an aspect ratio less than 0.9; and
said at least one refractive surface and said reflective surface cooperating to redirect edge-rays of said first light distribution substantially into the neighborhood of said second light distribution.

19. The device of claim 18, where said continuously connected reflective surface includes a discontinuous slope.

20. The device of claim 18, where said continuously connected reflective surface includes at least two opposing apertures bounding said reflective surface, and at least one additional hole in said reflective surface, wherein said hole is completely surrounded by said reflective surface.

* * * * *